Aug. 21, 1934.  H. J. BUETTNER  1,970,838
LAWN EDGE TRIMMER
Filed Sept. 30, 1933  2 Sheets-Sheet 2

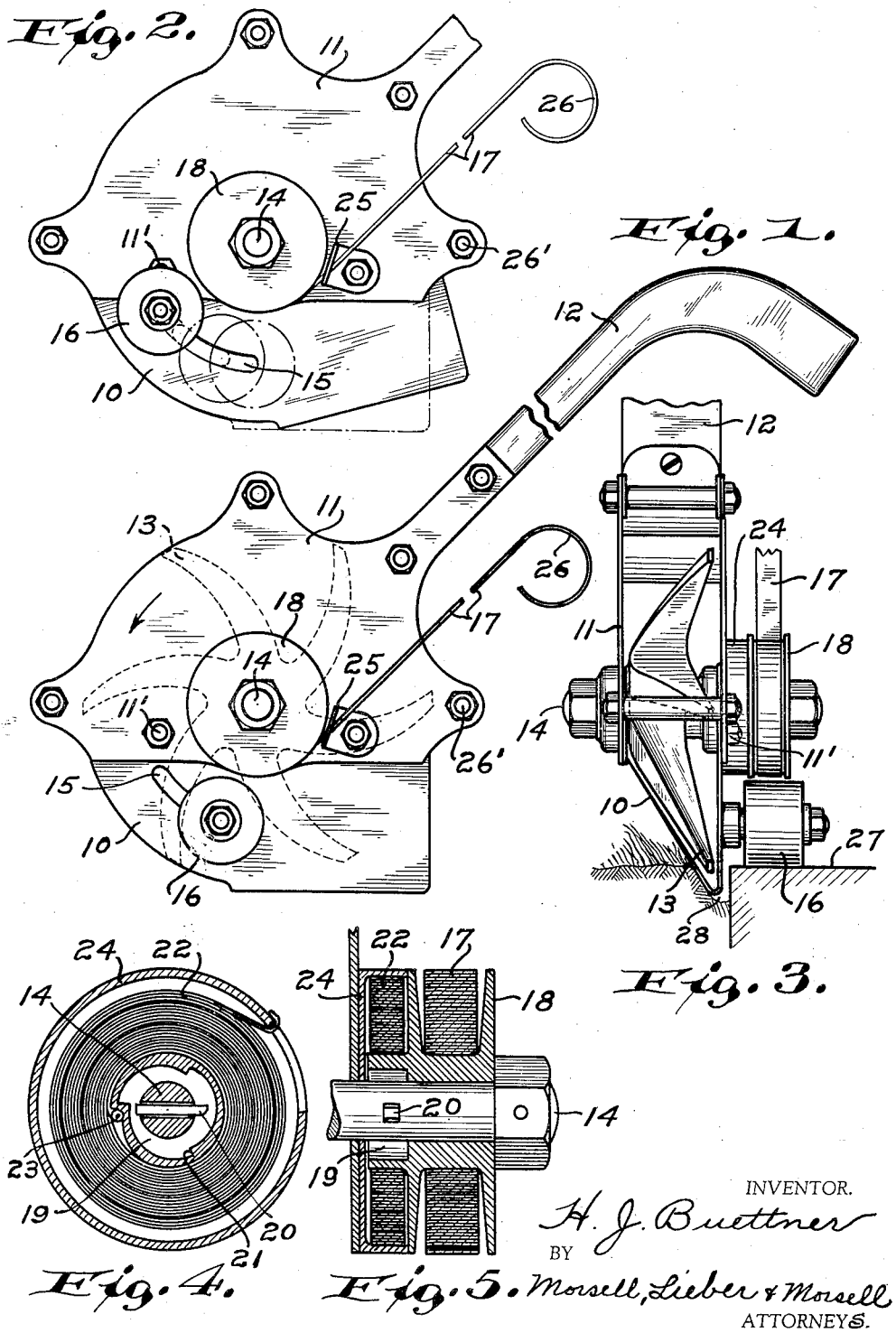

INVENTOR.
H. J. Buettner
BY Morsell, Lieber & Morsell
ATTORNEYS.

Patented Aug. 21, 1934

1,970,838

UNITED STATES PATENT OFFICE 1,970,838

LAWN EDGE TRIMMER

Henry J. Buettner, West Allis, Wis., assignor of one-tenth to Allen H. Koning and one-tenth to George W. Hanna, both of West Allis, Wis.

Application September 30, 1933, Serial No. 691,654

8 Claims. (Cl. 97—227)

The present invention relates in general to improvements in devices for trimming lawns along the edges of sidewalks, or closely adjacent to buildings and fences, or at any other place where it is difficult to secure a clean cut with an ordinary lawn mower.

Generally defined, an object of the invention is to provide an improved lawn edge trimmer which is simple and compact in construction, and which is moreover highly effective in use.

While it has heretofore been proposed to provide various forms of devices for trimming lawns along the edges of sidewalks and in other places which are relatively inaccessible to the ordinary lawn mowers, none of these prior edge trimmers have met with any degree of commercial success. In some of these prior implements, the cutting is effected by a fixed blade alone, and in others a rotary blade which is driven by the advancing motion of the device, is utilized either alone or in conjunction with another fixed blade. Although these prior structures may be relatively suitable for certain parts of the trimming operation and when conditions are perfect, they cannot be utilized to produce a clean cut of the grass and other vegetation, and efficient removal of the excess material and earth, under all conditions, and especially when the ground contains small stones and the vegetation is excessive, thus obstructing the free movement of the implement along the desired path. In order to insure a straight and uniform trim or cut, the advancing motion of the trimmer should not be undesirably interfered with by the cutters, and the cutting mechanism should therefore be positively actuated independently of the normal push or pull which advances the implement along a desired path.

It is therefore a more specific object of the present invention to provide an improved implement for trimming the edges of lawns, or for other similar service, which will produce a desirable cut under the most adverse conditions, by virtue of the fact that the cutting mechanism may be rapidly operated with the greatest ease, and independently of the advancing motion of the implement.

Another specific object of the invention is to provide an improved lawn edge trimmer having a rotor forming a part of the cutting mechanism, which is conveniently operable at any desired speed irrespective of the speed of travel of the trimmer along the ground.

Still another specific object of the invention is to provide an improved rotary lawn edge trimming device which may be effectively utilized to cut either a V-shaped groove along the side of a walk or the like, or the grass along a substantially level surface.

A further specific object of the invention is to provide a lawn trimming implement which is durable in construction, readily manipulable, and which may be manufactured and sold at minimum cost.

These and other objects and advantages of the invention will be apparent from the following detailed description.

A clear conception of several embodiments of the invention, and of the mode of constructing and of manipulating lawn edge trimmers built in accordance with the improvement, may be had by referring to the drawings accompanying and forming a part of this specification in which like reference characters designate the same or similar parts in the various views.

Fig. 1 is a side elevation of one type of the improved trimmer especially adapted to form a clean cut V-groove along the edges of sidewalks;

Fig. 2 is a fragmentary side elevation of the same trimmer, showing certain parts thereof in a different position of adjustment;

Fig. 3 is a front view of the trimmer of Fig. 1 with the upper portion of the advancing handle broken away;

Fig. 4 is an enlarged transverse section through the return spring of the rotor actuating mechanism;

Fig. 5 is a similarly enlarged longitudinal central section through the rotor actuating mechanism of Figs. 1 and 3;

Figure 7:
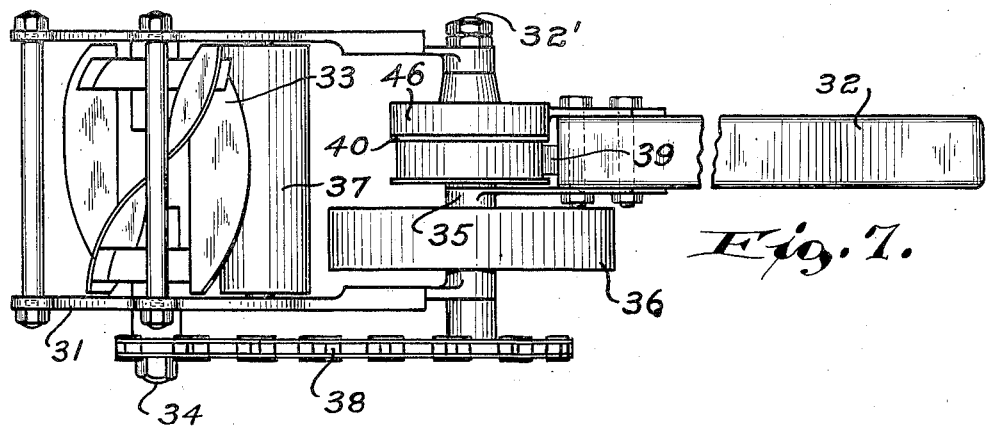
Fig. 7 is a top view of the edge trimmer of Fig. 6.
Figure 6:
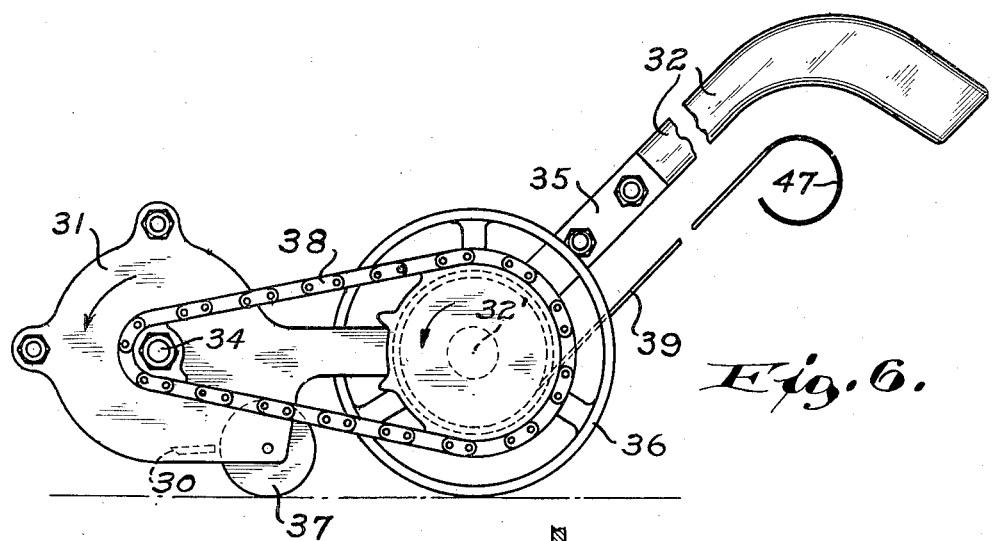
Fig. 6 is a side elevation of another type of lawn edge trimmer especially adapted to cut the grass along level but relatively inaccessible portions of a lawn.

Referring specifically to Figs. 1 to 5 inclusive of the drawings, the improved lawn edge trimmer illustrated therein is especially adapted for edging along a sidewalk, and comprises a V-shaped cutter blade 10 fixedly but adjustably attached to a carrier frame 11 secured to the lower end of a manipulating handle 12; a cutting rotor 13 rotatably supported by a horizontal shaft 14 upon the frame 11 and cooperable with the fixed blade 10 to produce a cutting action; and mechanism carried by the shaft at one side of the frame 11 and coacting with the shaft 14 to revolve the rotor 13 independently of the advancing movement of the implement.

The frame 11 may be constructed of sheet metal and rigidly attached to the wooden handle by bolts or otherwise, and the V-shaped cutter blade 10 may be formed of wear-resisting material and is preferably attached to the frame 11 by a bolt 11' so as to permit relative angular adjustment of the coacting parts as shown in Fig. 2. The perpendicular side of the blade 10 is provided with a slot 15 within which a supporting roller 16 is adjustably mounted so as to permit variation in the position of this roller 16 relative to the frame 11 as indicated in dot-and-dash and in full lines in Fig. 2.

The rotor 13 may be formed of any wear-resistant material, and is rotatable with the shaft 14 and relative to the cutting forward edges of the blade 10 in the direction of the arrow in Fig. 1, by the actuating mechanism specifically shown in Figs. 1, 4 and 5. This mechanism consists of an elongated member such as strong tape or a strap 17 wound about a drum 18 which is rotatably supported upon the rotor shaft 14, and a one-way automatic clutch 19 coacting with the drum 18 and with the shaft 14 as shown in Fig. 4. The clutch 19 comprises a shiftable pawl 20 slidable in a radial slot penetrating the shaft 14, this pawl being adapted to engage abutments 21 formed on the drum 18 when the drum is rotated in one direction as by pulling upon the strap, and riding clear of the abutments 21 when the drum 18 is oppositely rotated. The drum 18 is adapted to be thus oppositely rotated whenever the strap 17 is released, by a coil spring 22 having one end secured within a notch 23 in the hub of the drum, and having its opposite end attached to a confining casing 24 permanently secured to the main frame 11. The inner end of the strap 17 is likewise secured to the drum 17 and the strap extends through a guide 25 and has its outer end provided with a loop 26 which facilitates pulling of the strap for operation of the rotor 13. An ordinary débris catcher may also be attached to the rear clamping bolt 26' of the main frame 11, and the space between this bolt and the handle 12 is open to permit the rotor 13 to throw the removed grass, earth and stones into the débris catcher.

During normal use of the improved lawn edge trimmer just described, the cutter blade 10 is fixed to the frame 11 in properly adjusted position, by means of the clamping bolt 11', and the manipulating handle 12 is utilized to push or pull the implement along the edge of a sidewalk 27 while the supporting roller 16 rests upon the sidewalk, as clearly shown in Fig. 3. The lower portion of the blade 10 is then adapted to produce a V-shaped cut 28 closely adjacent to the edge of the sidewalk 27, and the depth of this cut will depend upon the setting of the roller 16 along the slot 15. The rotor 13 which cooperates with the forward edge of the blade 10, will not revolve due to the advancing motion of the implement, and must be manually rotated independently of the movement of the blade 10 along the ground, by exerting successive pulls upon the loop 26 of the strap 17. When the operator pulls upon the loop 26, the strap 17 is unwound from the drum 18 thereby causing this drum to revolve and simultaneously causing the pawl 20 of the clutch 19 to engage one of the abutments 21, and to thereby impart rapid rotary motion from the drum 18 to the rotor 13 through the main shaft 14 to which the rotor is rigidly attached. Upon release of the pull, the spiral spring 22 immediately becomes effective to rotate the drum 18 in the opposite direction upon the rotating shaft 14, and during such opposite or return rotation of the drum 18 by the spring 22, the clutch pawl 20 rides clear of the abutments 21 and the forward rotation of the shaft 14 and rotor 13 continues by virtue of the inertia of these parts. Such intermittent driving impulses may be imparted to the rotor 13 and shaft 14 as frequently and as rapidly as desired, and the rotor 13 during its revolution, not only produces a clean cut groove 28, but also throws the removed grass, earth and stones away from the path of cutting and clear of the implement.

Figures 8, 9:
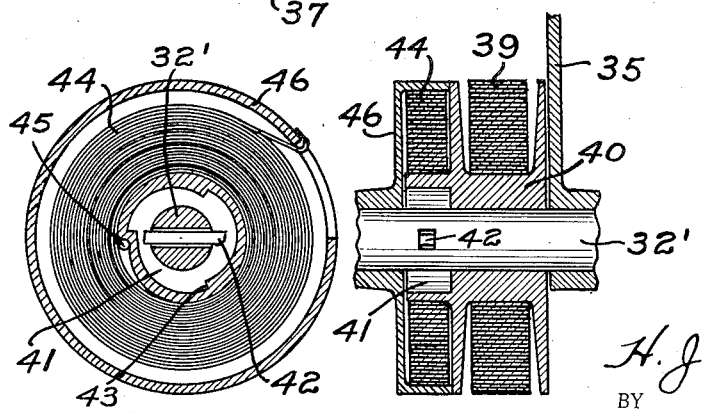
Fig. 8 is an enlarged transverse section through the return spring of the rotor actuating mechanism of the device shown in Figs. 6 and 7.
Fig. 9 is a similarly enlarged longitudinal central section through the rotor actuating mechanism of which Fig. 8 constitutes a part.

Referring specifically to Figs. 7 to 9 inclusive of the drawings, the modified lawn trimmer illustrated therein is especially adapted for trimming along fences or buildings, and this implement comprises a straight cutter blade 30 rigidly attached to a frame 31 secured to the lower end of a manipulating handle 32 by means of a pivot shaft 32'; a cutting rotor 33 rotatably supported upon the frame 31 by means of a main shaft 34 and cooperable with the forward edge of the blade 30 to produce a cutting action; and mechanism carried by the shafts 32', 34 and coacting with the rotor 33 to revolve the same independently of the advancing motion of the implement along the ground.

The frame 31 may likewise be constructed of sheet metal sides connected by spacing bolts, and the pivot shaft 32' may be rotatably mounted in a metal bracket 35 rigidly attached to the lower end of the wooden handle 32. A roller 36 which is rotatably mounted upon the pivot shaft 32', provides a direct rolling support for the handle 32 and for the rear portion of the frame 31, and a longer roller 37 rotatably supported in the frame 31 near the blade 30 provides a similar rolling support for the forward portion of the frame 31 as in an ordinary lawn mower.

The rotor 33 is fixed to the main shaft 34 and this shaft is drivingly connected to the pivot shaft 32' by chain gearing 38, and the mechanism for positively driving the shafts 32', 34 independently of the advancing motion of the implement, is carried by the pivot shaft 32 and is clearly shown in Figs. 8 and 9. This mechanism comprises a strap 39 wound around a drum 40, and a one-way clutch 41 interposed between the drum 40 and the pivot shaft 32', the drum being rotatably supported upon the pivot shaft adjacent to the bracket 35. The clutch consists of a pawl 42 slidably mounted in a radial slot penetrating the shaft 32', and cooperable with abutments 43 formed on the hub of the drum to impart rotary motion from the drum 40 to the shaft 32' in one direction, while permitting free relative rotation of these parts in the opposite direction. A flat coiled or spiral spring 44 has one end attached to a notch 45 formed in the drum hub, and has its opposite end secured to a casing 46 secured to the bracket 31, this spring 44 being housed within the fixed casing 46. The outer end of the rotor actuating strap 39 is provided with a loop 47, and this strap may be guided in any suitable manner as by a guide carried by the handle 32.

During normal operation of the modified trimming implement of Figs. 7 to 9 inclusive, the trimmer may be advanced along the ground by merely pushing or pulling upon the handle 32, the rollers 36, 37 permitting such movement of the device without material resistance. The blade 30 may as in the ordinary lawn mower be adjustable relative to the ground line in order to regulate the cut, and the rotor 33 will not normally revolve while the implement is being advanced with the aid of the handle 32. In order to impart positive rotation to the rotor 33, it is only necessary to intermittently pull upon the loop 47 of the strap 39, thus causing the clutch 41 to positively impart forward rotation to the shaft 32', which forward rotation is transmitted through the chain gearing 38 and main shaft 34 to the rotor 33. When the strap 39 is released, the spring 44 immediately becomes effective to impart reverse rotation to the drum 40 as in the case previously described, thereby permitting continued forward rotation of the rotor 33 while returning the drum 40 to a position preparatory to imparting a subsequent, rotative impulse to the shaft 32'. These impulses may obviously be applied as frequently and as rapidly as desired, and the inertia of the rotor 33 and of the elements which rotate therewith, will cause continued revolution of the rotor during the periods of activity of the spring 44. It will thus be noted that in this modified device, as in the case previously described, the rotor 33 is again operable independently of the advancing motion of the implement and thus insures uniform and clean trimming of the lawn.

From the foregoing description it will be apparent that the present invention provides improved lawn edge trimming mechanism which is simple and compact in construction and which is moreover highly efficient in operation. By virtue of the fact that the revolution of the rotor is not dependent upon the rate of advancement of the implement itself, more effective cutting is assured since the rotor can be operated as rapidly as necessary in order to insure most efficient cutting. The rotor driving mechanism comprising the strap for imparting rotative impulses to the rotor and the spring for returning the driving strap to normal position, has proven highly successful in actual commercial operation, and the improved implements may obviously be manufactured and sold at relatively low cost.

It should be understood that it is not desired to limit the invention to the exact details of construction and to the precise mode of operation herein shown and described, for various modifications within the scope of the claims may occur to persons skilled in the art.

It is claimed and desired to secure by Letters Patent:

1. In a lawn edge trimmer, a blade, manually operable means fixedly supporting said blade for advancing movement along the ground, a rotor carried by said supporting means and cooperable with said blade to produce a cutting action closely adjacent to the ground, manually operable means movable from a definite starting position and independently of the movement of said supporting means for revolving said rotor relative to said blade, and means for automatically restoring said rotor operating means to starting position after rotation of said rotor.

2. In a lawn edge trimmer, a blade, manually propelled means for supporting and for moving said blade along the ground, a rotor carried by said means and cooperable with said blade to produce a cutting action, manually manipulable means for imparting intermittent rotative impulses to said rotor independently of the advancing motion of said blade, and means for automatically restoring said rotation imparting means to active position after each impulse.

3. In a lawn edge trimmer, a blade, manually operable means for supporting and for moving said blade along the ground, a rotor cooperable with said blade to produce a cutting action, an elongated element adapted to be wound upon itself and to be subsequently unwound in order to impart rotation to said rotor, and resilient means for winding said elongated element upon itself.

4. In a lawn edge trimmer, a blade, manually operable means for supporting and for moving said blade along the ground, a rotor cooperable with said blade to produce a cutting action, an elongated element adapted to be wound upon itself and to be subsequently unwound in order to impart rotation to said rotor, and a spirally wound spring cooperable with said element to wind the same upon itself.

5. In a lawn edge trimmer, a blade, manually operable means for supporting and for moving said blade along the ground, a rotor cooperable with said blade to produce a cutting action, a drum, a one-way clutch connecting said drum and said rotor, and means cooperable with said drum for intermittently revolving said rotor independently of the movement produced by said manually operable means.

6. In a lawn edge trimmer, a blade, manually operable means for supporting and for moving said blade along the ground, a rotor cooperable with said blade to produce a cutting action, a drum, a one-way clutch connecting said drum and said rotor, a strap adapted to be wound around said drum and to be unwound to impart rotative movement to said drum, and a spring for rotating said drum to effect winding of said strap thereabout.

7. In a lawn edge trimmer, a blade, means for transporting said blade along the ground, a rotor cooperable with said blade to produce a cutting action, a drum, a one-way clutch between said drum and said rotor, a strap cooperating with said drum to connect the same with said rotor through said clutch, and a spring cooperable with said drum to disconnect the same from said rotor and to wind said strap upon said drum.

8. In a lawn edge trimmer, a blade, means for supporting and for moving said blade along the ground, a rotor cooperable with said blade to produce a cutting action, manually operable means movable in one direction to revolve said rotor relative to said blade, and means for automatically moving said manually operable means in the opposite direction without interfering with the revolution of said rotor.

HENRY J. BUETTNER.